United States Patent
Kim

(10) Patent No.: US 11,280,242 B1
(45) Date of Patent: Mar. 22, 2022

(54) METHOD FOR CONTROLLING EXHAUST AFTERTREATMENT SYSTEM FOR VEHICLES

(71) Applicants: Hyundai Motor Company, Seoul (KR); KIA Motors Corporation, Seoul (KR)

(72) Inventor: Min Jae Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/168,467

(22) Filed: Feb. 5, 2021

(30) Foreign Application Priority Data

Sep. 10, 2020 (KR) .................. 10-2020-0116085

(51) Int. Cl.
*F01N 3/20* (2006.01)
*F01N 9/00* (2006.01)
*F01N 11/00* (2006.01)

(52) U.S. Cl.
CPC ............ *F01N 3/208* (2013.01); *F01N 3/206* (2013.01); *F01N 9/00* (2013.01); *F01N 9/005* (2013.01);
(Continued)

(58) Field of Classification Search
CPC . F01N 3/208; F01N 3/206; F01N 9/00; F01N 2900/0418; F01N 2610/02;
(Continued)

(56) References Cited

U.S. PATENT DOCUMENTS 8,635,030 B2 * 1/2014 Zanetti .................. F02D 41/146
702/23

FOREIGN PATENT DOCUMENTS

KR 10-2015-0029011 A 3/2015

* cited by examiner

*Primary Examiner* — Brandon D Lee
(74) *Attorney, Agent, or Firm* — Morgan, Lewis & Bockius LLP

(57) ABSTRACT

A method for controlling an exhaust aftertreatment system for vehicles includes: determining, by a controller, whether or not a designated regeneration operation is finished; accumulating, by the controller, a first amount of $NO_x$ emission measured by a rear end $NO_x$ sensor of an selective catalytic reduction (SCR) apparatus and a second amount of $NO_x$ emission calculated by an $NO_x$ emission amount model respectively for a first reference period of time immediately after the regeneration operation is finished; determining, by the controller, whether or not a difference between an accumulated value of the first amount of $NO_x$ emission and an accumulated value of the second amount of $NO_x$ emission exceeds a reference value when the first reference period of time has elapsed; and correcting, by the controller, a model purification efficiency using a sensor purification efficiency when the difference between the accumulated values exceeds the reference value.

10 Claims, 5 Drawing Sheets

(52) U.S. Cl.
CPC ......... *F01N 11/00* (2013.01); *F01N 2560/026* (2013.01); *F01N 2560/14* (2013.01); *F01N 2610/02* (2013.01); *F01N 2900/0418* (2013.01); *F01N 2900/1621* (2013.01)

(58) Field of Classification Search
CPC ........... F01N 2560/026; F01N 2560/14; F01N 11/00; F01N 2900/1621; F01N 9/005
See application file for complete search history.

METHOD FOR CONTROLLING EXHAUST AFTERTREATMENT SYSTEM FOR VEHICLES

CROSS-REFERENCE TO RELATED APPLICATION

This application claims the benefit of priority to Korean Patent Application No. 10-2020-0116085, filed on Sep. 10, 2020, in the Korean Intellectual Property Office, the disclosure of which is incorporated herein by reference in its entirety.

TECHNICAL FIELD

The present disclosure relates to a method for controlling an exhaust aftertreatment system for vehicle engines.

BACKGROUND

Nitrogen oxides ($NO_x$) included in exhaust gas generated when the engine of a vehicle is operated are a serious factor causing air pollution, and thus, a urea-selective catalytic reduction (SCR) apparatus is applied as an exhaust aftertreatment apparatus configured to purify nitrogen oxides ($NO_x$) exhausted from the vehicle.

The SCR apparatus allows ammonia formed by pyrolysis of urea in exhaust gas to react with nitrogen oxides ($NO_x$) with the aid of a catalyst so as to be purified into water and nitrogen.

Urea injected upstream from the SCR apparatus should be injected in an amount suitable for purifying nitrogen oxides ($NO_x$) in the exhaust gas.

When an excessively large amount of urea is injected, 'ammonia slip', in which a surplus amount of ammonia which does not participate in reaction is exhausted, occurs and the excessively large amount of urea is consumed, and when an excessively small amount of urea is injected, unpurified nitrogen oxides ($NO_x$) are discharged.

In order to prevent ammonia slip of the SCR apparatus, an ammonia sensor may be installed downstream from the SCR apparatus, but the ammonia sensor is expensive and thus the cost of the vehicle is increased.

The above description has been provided to aid in understanding of the background of the present disclosure and should not be interpreted as conventional technology known to those skilled in the art.

SUMMARY

The present disclosure has been made in view of the above problems, and it is an object of the present disclosure to provide a method for controlling an exhaust aftertreatment system for vehicles in which ammonia slip of a selective catalytic reduction (SCR) apparatus may be prevented without providing an ammonia sensor downstream from the SCR apparatus so as to avoid an increase in vehicle costs, a suitable amount of urea may be injected in consideration of a change in purification efficiency due to aged deterioration of the SCR apparatus, and ultimately the SCR apparatus may purify $NO_x$ in exhaust gas into the optimum state so as to satisfy various regulations.

In accordance with the present disclosure, the above and other objects can be accomplished by the provision of a method for controlling an exhaust aftertreatment system for vehicles, the method including: determining, by a controller, whether or not a designated regeneration operation is finished; accumulating, by the controller, a first amount of $NO_x$ emission measured by a rear end $NO_x$ sensor of a selective catalytic reduction (SCR) apparatus and a second amount of $NO_x$ emission calculated by an $NO_x$ emission amount model respectively for a designated first reference period of time immediately after the regeneration operation is finished; determining, by the controller, whether or not a difference between an accumulated value of the first amount of $NO_x$ emission and an accumulated value of the second amount of $NO_x$ emission exceeds a designated reference value when the first reference period of time has elapsed; and correcting, by the controller, a model purification efficiency used in the $NO_x$ emission amount model using a sensor purification efficiency acquired by a front end $NO_x$ sensor and the rear end $NO_x$ sensor of the SCR apparatus when the difference between the accumulated values exceeds the reference value.

In the correcting the model purification efficiency, the controller may correct the model purification efficiency by calculating an efficiency correction coefficient configured to make the model purification efficiency equal to the sensor purification efficiency, and multiplying the model purification efficiency by the efficiency correction coefficient.

When the controller calculates a urea injection amount using corrected model purification efficiency acquired by multiplying the model purification efficiency by the efficiency correction coefficient, the controller may calculate the urea injection amount using a corrected $NH_3$—$NO_x$ reaction ratio acquired by multiplying a $NH_3$—$NO_x$ reaction ratio by a reaction ratio correction coefficient, which is a reciprocal of the efficiency correction coefficient.

The method may further include, when a next regeneration operation is performed after the correcting the model purification efficiency, accumulating, by the controller, a third $NO_x$ emission amounts measured by the rear end $NO_x$ sensor of the SCR apparatus and a fourth $NO_x$ emission amounts calculated by the $NO_x$ emission amount model respectively for a designated second reference time immediately after the regeneration operation is finished, determining, by the controller, whether or not an accumulated value of the third $NO_x$ emission amounts measured by the rear end $NO_x$ sensor is greater than an accumulated value of the fourth $NO_x$ emission amounts calculated by the $NO_x$ emission amount model, and correcting, by the controller, an ammonia occludable amount of the SCR apparatus when the accumulated value of the third $NO_x$ emission amounts measured by the rear end $NO_x$ sensor is greater than the accumulated value of the fourth $NO_x$ emission amounts calculated by the $NO_x$ emission amount model.

The controller may correct the ammonia occludable amount of the SCR apparatus by multiplying the ammonia occludable amount by a designated occlusion coefficient, and the occlusion coefficient may have a value in a range of 0 to 1.

The controller may calculate the urea injection amount using a following equation, urea injection amount=$NO_x$ inflow rate×(corrected $NH_3$—$NO_x$ reaction ratio)×(corrected model purification efficiency)+(ammonia occludable amount×occlusion coefficient).

While the controller controls the calculated urea injection amount to be injected into a front end of the SCR apparatus, the controller may gradually decrease the occlusion coefficient until a fifth $NO_x$ emission amount calculated by the rear end $NO_x$ sensor becomes equal to a sixth $NO_x$ emission amount calculated by the $NO_x$ emission amount model.

The controller may calculate a corrected ammonia occludable amount by correcting the ammonia occludable amount of the SCR apparatus using the occlusion coefficient when the fifth $NO_x$ emission amount calculated by the rear end $NO_x$ sensor becomes equal to the sixth $NO_x$ emission amount calculated by the $NO_x$ emission amount model, and the controller may calculate the urea injection amount using a following equation and controls the calculated urea injection amount to be injected, urea injection amount=$NO_x$ inflow rate×(corrected $NH_3$—$NO_x$ reaction ratio)×(corrected model purification efficiency)+(corrected ammonia occludable amount).

When the second reference time is set to be equal to the first reference time, the controller may sequentially turn on a slip diagnosis flag after correcting the model purification efficiency, accumulate the third $NO_x$ emission amounts measured by the rear end $NO_x$ sensor of the SCR apparatus and the fourth $NO_x$ emission amounts calculated by the $NO_x$ emission amount model respectively for the first reference time immediately after the regeneration operation is finished, and determine whether or not an accumulated value of the third $NO_x$ emission amounts measured by the rear end $NO_x$ sensor is greater than an accumulated value of the fourth $NO_x$ emission amounts calculated by the NOx emission amount model, and correct the ammonia occludable amount of the SCR apparatus, when the slip diagnosis flag is turned on.

The controller may turn off the slip diagnosis flag after the correcting the ammonia occludable amount of the SCR apparatus.

The $NO_x$ emission amount model may be calculated using a following equation, $NO_x$ emission amount model=$NO_x$ inflow rate−$NO_x$ purification amount model=$NO_x$ inflow rate×(1-model purification efficiency), where, $NO_x$ purification amount model=$NO_x$ inflow rate× model purification efficiency.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts.

Figure 1:
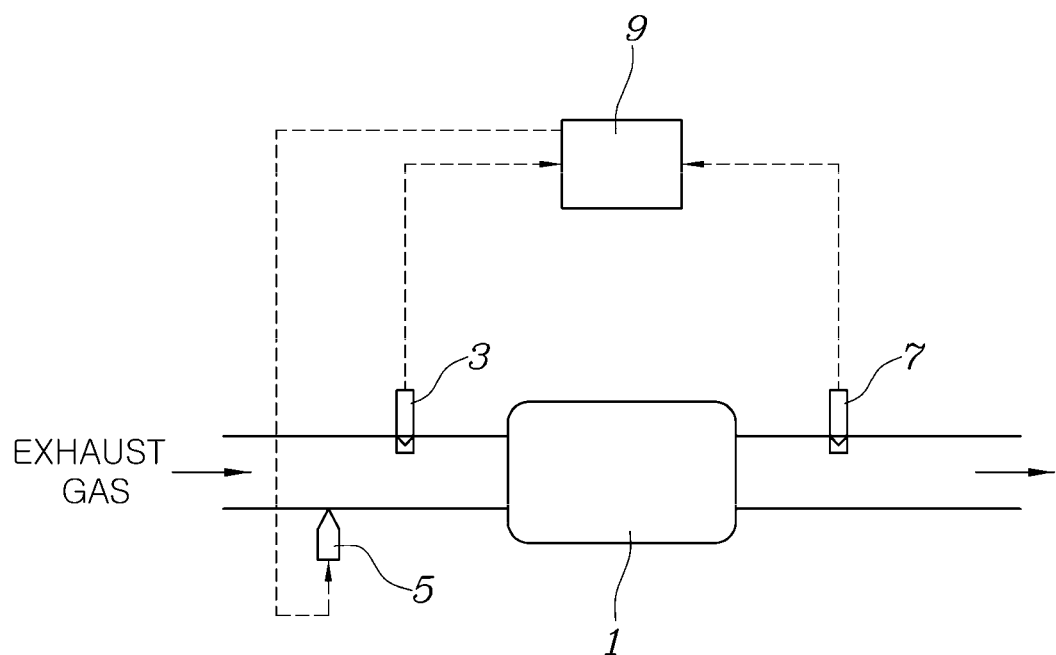
FIG. 1 is a view exemplarily illustrating an exhaust aftertreatment system for vehicles to which the present disclosure is applicable.

FIG. 1 is a view exemplarily illustrating an exhaust aftertreatment system for vehicles to which the present disclosure is applicable, a selective catalytic reduction (SCR) apparatus 1 configured to purify nitrogen oxides ($NO_x$) in exhaust gas emitted from an engine is provided, a front end $NO_x$ sensor 3 configured to measure nitrogen oxides ($NO_x$) in the exhaust gas flowing into the SCR apparatus 1 and a urea injection apparatus 5 configured to inject urea are provided in a region upstream from the SCR apparatus 1, and a rear end $NO_x$ sensor 7 configured to measure nitrogen oxides ($NO_x$) in the exhaust gas having passed through the SCR apparatus 1 is provided in a region downstream from the SCR apparatus 1.

Here, the term 'front end' does not necessarily mean the front end of the SCR apparatus 1, and is to be interpreted as any arbitrary position upstream from the SCR apparatus 1, which is suitable for measuring nitrogen oxides ($NO_x$) flowing into the SCR apparatus 1. In addition, the term 'rear end' does not necessarily mean the rear end of the SCR apparatus 1, and is to be interpreted as any arbitrary position downstream from the SCR apparatus 1, which is suitable for measuring nitrogen oxides ($NO_x$) emitted from the SCR apparatus 1.

A controller 9 receives signals from the front end $NO_x$ sensor 3 and the rear end $NO_x$ sensor 7, and controls the urea injection apparatus 5 to inject urea.

In the present disclosure, the controller 9 may be a computer or a processor such as a CPU, or more specifically, an electronic control unit (ECU) as an embedded system configured to control electrical systems in a vehicle. The controller 9 may be programmed to communicate with the front end $NO_x$ sensor 3, the rear end $NO_x$ sensor 7, and the urea injection apparatus 5, so as to control the connected devices.

In the present disclosure, no separate ammonia sensor is provided downstream from the SCR apparatus 1.

Figure 2:
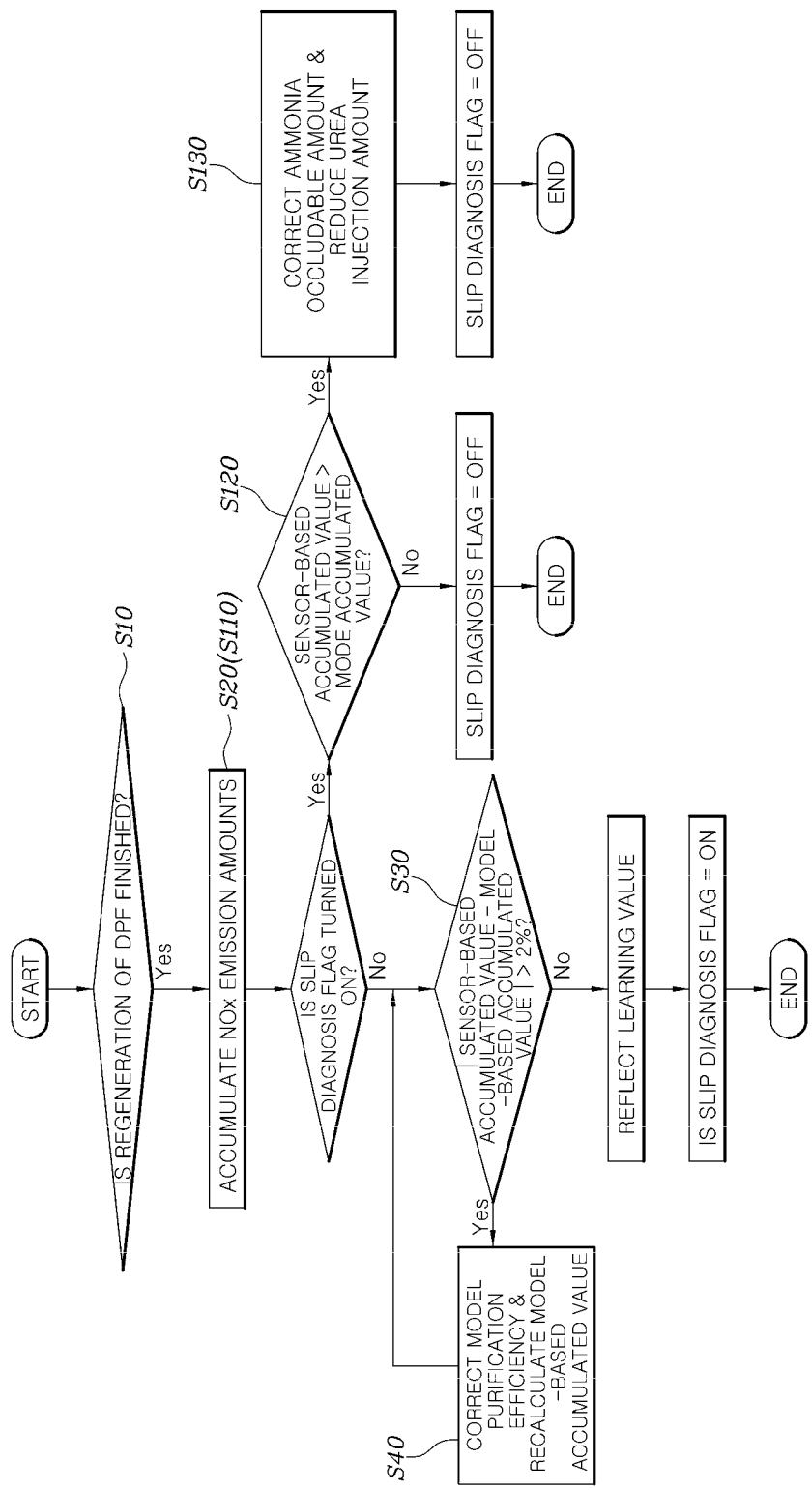
FIG. 2 is a flowchart illustrating a method for controlling an exhaust aftertreatment system for vehicles according to one embodiment of the present disclosure.

Referring to FIG. 2, a method for controlling the exhaust aftertreatment system for vehicles according to the present disclosure includes determining, by the controller 9, whether or not a designated regeneration operation is finished (S10), accumulating, by the controller 9, $NO_x$ emission amounts measured by the rear end $NO_x$ sensor 7 of the SCR apparatus 1 and $NO_x$ emission amounts calculated by an $NO_x$ emission amount model respectively for a designated first reference time immediately after the regeneration operation is finished (S20), determining, by the controller 9, whether or not a difference between an accumulated value of the $NO_x$ emission amounts measured by the rear end $NO_x$ sensor 7 and an accumulated value of the $NO_x$ emission amounts calculated by the $NO_x$ emission amount model exceeds a designated reference value when the first reference time has elapsed (S30), and correcting, by the controller 9, model purification efficiency used in the $NO_x$ emission amount model using sensor purification efficiency acquired by the front end $NO_x$ sensor 3 and the rear end $NO_x$ sensor 7 when the difference between the accumulated values exceeds the reference value (S40).

Here, an operation of increasing a temperature to a level at which all ammonia occluded in the SCR apparatus 1 may be removed by raising the temperature of the SCR apparatus 1 to 500° C. or higher, such as regeneration of a diesel particulate filter (DPF), is called a regeneration operation.

Therefore, if the SCR apparatus 1 includes an SCR-catalyzed diesel particulate filter (SDPF), i.e., a conventional DPF with SCR coating, or is formed by supporting an SCR catalyst on a carrier, when the above operation of increasing the temperature to the level at which all occluded ammonia is removed is performed, the regeneration operation is regarded as being performed.

For reference, in the present disclosure, as exemplarily shown in FIG. 2, the regeneration operation means regeneration of the DPF. Further, the operation of FIG. 2 is continuously performed repeatedly during the driving of the vehicle.

The first reference time is set based on a time for which ammonia is not occluded in the SCR apparatus 1 because the temperature of the SCR apparatus 1 is raised due to the above regeneration operation.

That is, the carrier or the DPF of the SCR apparatus is characterized in that ammonia is not occluded thereinto at a high temperature, and thus, during this time, an $NO_x$ purification amount and an NOx emission amount may be more precisely calculated using $NO_x$ and urea flowing into the SCR apparatus 1 and $NO_x$ discharged from the SCR apparatus 1, without regard to an ammonia occlusion amount and an ammonia occludable amount in the SCR apparatus 1. For this reason, in the present disclosure, this time is used.

Therefore, the first reference time is set based on the time for which occlusion of ammonia is not performed in the SCR apparatus 1 for the above-stated reason. Particularly, the first reference time may be set to the time for which occlusion of ammonia is not performed in the SCR apparatus 1, and further include a point in time at which some occlusion of ammonia is performed without affecting achievement of the objects of the present disclosure.

The controller 9 determines the suitability of the $NO_x$ emission amount model by accumulating $NO_x$ emission amounts measured by the rear end $NO_x$ sensor 7 and $NO_x$ emission amounts calculated by the $NO_x$ emission amount model respectively for the first reference time immediately after the regeneration operation and determining whether or not a difference between accumulated values exceeds the reference value, as described above.

Here, a value suitable for determining whether or not the above $NO_x$ emission amount model and the model purification efficiency need to be corrected, which is acquired by a great number of experiments and analyses, may be selected as the reference value, and the reference value may be set to 2% or the like, as exemplarily shown in FIG. 2.

That is, referring to FIG. 2, when the difference between the accumulated value of the $NO_x$ emission amounts measured by the rear end $NO_x$ sensor 7 (i.e., a sensor-based accumulated value) and the accumulated value of the $NO_x$ emission amounts calculated by the $NO_x$ emission amount model (i.e., a model-based accumulated value) exceeds 2%, it is determined that the characteristics of the SCR apparatus 1 are changed into a state in which the $NO_x$ emission amount model and the model purification efficiency are unsuitable, and thus the $NO_x$ emission amount model and the model purification efficiency are corrected.

Here, the $NO_x$ emission amount model is calculated using the following equation:

$NO_x$ emission amount model=NO inflow rate−$NO_x$ purification amount model=$NO_x$ inflow rate×(1− model purification efficiency).

The NO purification amount model is calculated using the following equation:

$NO_x$ purification amount model=NO inflow rate× model purification efficiency.

The model purification efficiency may be a value which the controller 9 has as the purification efficiency of the SCR apparatus 1, and the NO inflow rate may be measured by the front end NO sensor 3.

As described above, in the NO emission amount model, the NO emission amount is calculated using the model purification efficiency, and thus, when there is an error in the model purification efficiency, an error in the $NO_x$ emission amount calculated by the $NO_x$ emission amount model occurs.

Figure 3:
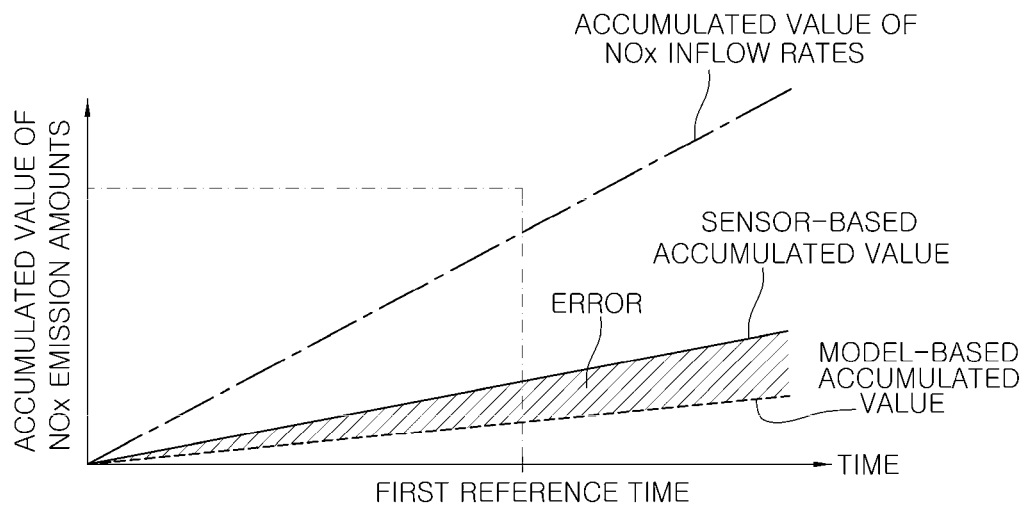
FIG. 3 is a graph showing accumulated values of $NO_x$ emission amounts as time passes.

FIG. 3 is a graph showing accumulated values of $NO_x$ emission amounts as time passes, the graph shows the accumulated value of the $NO_x$ emission amounts measured by the rear end $NO_x$ sensor 7 of the SCR apparatus 1 and the accumulated value of the $NO_x$ emission amounts calculated by the $NO_x$ emission amount model and indicates occurrence of a difference therebetween, and such a difference indicates that there is an error in the model purification efficiency used in the $NO_x$ emission amount model.

For reference, FIG. 3 also shows an accumulated value of $NO_x$ inflow rates calculated based on values measured by the front end $NO_x$ sensor 3, and a difference between the accumulated value of $NO_x$ inflow rates and the accumulated value of the NOx emission amounts of the rear end $NO_x$ sensor 7 may be interpreted as an accumulated value of amounts of $NO_x$ purified by the SCR apparatus 1.

In correcting the model purification efficiency (S40), the controller 9 corrects the model purification efficiency by calculating an efficiency correction coefficient which makes the model purification efficiency equal to the sensor purification efficiency and multiplying the model purification efficiency by the efficiency correction coefficient.

For reference, the sensor purification efficiency is calculated using an $NO_x$ inflow rate based on the measured value of the front end $NO_x$ sensor 3 and an NOx emission amount based on the measured value of the rear end $NO_x$ sensor 7.

That is, a corrected model purification efficiency is calculated by multiplying the model purification efficiency by the efficiency correction coefficient, and thereafter, the controller 9 calculates a urea injection amount using the corrected model purification efficiency.

Further, when the controller 9 calculates the urea injection amount using the corrected model purification efficiency calculated by multiplying the model purification efficiency by the efficiency correction coefficient, the controller 9 calculates the urea injection amount using a corrected $NH_3$—$NO_x$ reaction ratio calculated by multiplying a $NH_3$—$NO_x$ reaction ratio by a reaction ratio correction coefficient which is the reciprocal of the efficiency correction coefficient.

That is, the controller 9 calculates the urea injection amount using the following equation, and then controls the urea injection apparatus 5 to inject the calculated urea injection amount:

urea injection amount=

$NO_x$ inflow rate×($NH_3$—$NO_x$ reaction ratio×reaction ratio correction coefficient)×(model purification efficiency×efficiency correction coefficient)+(ammonia occludable amount)=

$NO_x$ inflow rate×(corrected $NH_3$—$NO_x$ reaction ratio)×

(corrected model purification efficiency)+(ammonia occludable amount).

Here, reaction ratio correction coefficient×efficiency correction coefficient=1.

For example, on the assumption that the sensor purification efficiency is 80% when the $NH_3$—$NO_x$ reaction ratio is 0.37 and the model purification efficiency is 70%, an error in the model purification efficiency in the current state is 10% and, in order to reduce the error, the model purification efficiency is corrected as follows.

<Before Correction> urea injection amount=$NO_x$ inflow rate×(0.37)×

(0.7)

<After Correction> urea injection amount=$NO_x$ inflow rate×(0.37×

0.875)×(0.7×1.142)=$NO_x$ inflow rate×(0.324)×(0.8)

Here, 0.875×1.142=1.

For reference, the ammonia occludable amount used to calculate the urea injection amount is a constant which is merely added, and will thus be omitted for the purpose of brevity of description.

That is, in the above example, because the corrected model purification efficiency becomes 0.8 (80%) and is exactly equal to the sensor purification efficiency, an accumulated value of $NO_x$ emission amounts calculated by the $NO_x$ emission amount model using the corrected model purification efficiency (i.e., a recalculated model-based accumulated value) becomes equal to the sensor-based accumulated value, and thus, the error is removed.

FIG. 2 illustrates that the model purification efficiency is corrected, the model-based accumulated value is recalculated using the corrected model purification efficiency, the recalculated model-based accumulated value is compared with the sensor-based accumulated value, it is confirmed that a difference between the recalculated model-based accumulated value and the sensor-based accumulated value is less than the reference value, and then the corrected model purification efficiency is reflected as a learning value.

Figure 4:
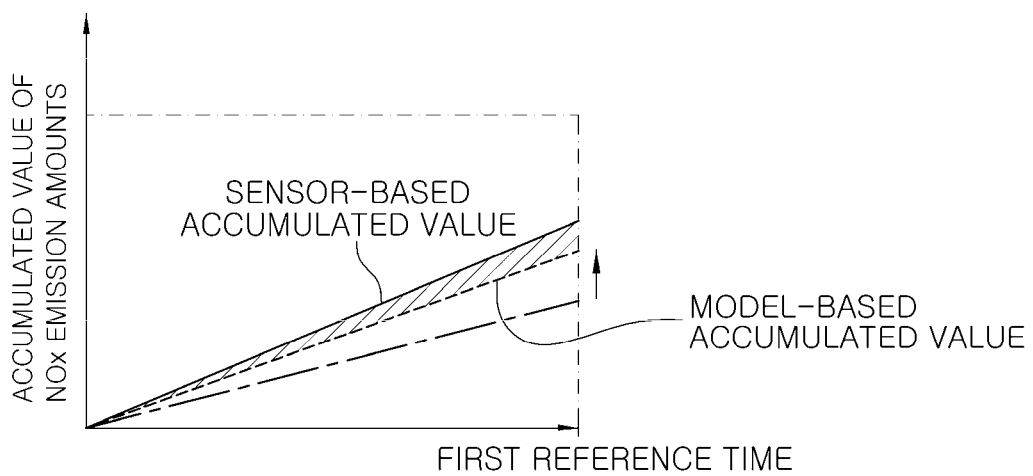
FIG. 4 is a graph showing accumulated values of $NO_x$ emission amounts for a first reference time.
Figure 5:
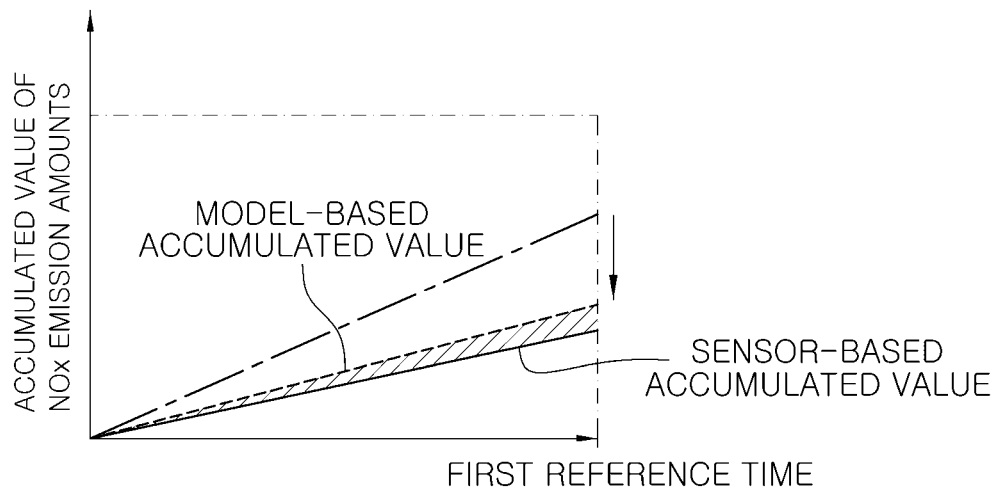
FIG. 5 is another graph showing accumulated values of $NO_x$ emission amounts for the first reference time.

For reference, FIG. 4 indicates that, when the sensor-based accumulated value is greater than the model-based accumulated value after the first reference time, the model-based accumulated value is recalculated using the above-corrected purification efficiency and the recalculated model-based accumulated value becomes the sensor-based accumulated value, and FIG. 5 indicates that, when the sensor-based accumulated value is less than than the model-based accumulated value after the first reference time, the model-based accumulated value is recalculated using the above-corrected purification efficiency and the recalculated model-based accumulated values becomes the sensor-based accumulated value.

Here, the reason why the reaction ratio correction coefficient is the reciprocal of the efficiency correction coefficient is to maintain the urea injection amount equal to the previous state thereof so as not to change actual purification efficiency in the present disclosure, because, if the purification efficiency of the exhaust aftertreatment system is lowered by correcting the model used to calculate the urea injection amount, the exhaust aftertreatment system is regarded as a defeated device, which is illegal.

Therefore, according to the present disclosure, in consideration of a change in the model purification efficiency due to aged deterioration of the SCR apparatus 1, the SCR apparatus 1 may consistently maintain suitable purification in compliance with regulations while the model purification efficiency is corrected to a suitable value.

The method for controlling the exhaust aftertreatment system for vehicles according to the present disclosure further includes, when a next regeneration operation is performed after correcting the model purification efficiency, accumulating, by the controller 9, $NO_x$ emission amounts measured by the rear end $NO_x$ sensor 7 of the SCR apparatus 1 and $NO_x$ emission amounts calculated by the $NO_x$ emission amount model respectively for a designated second reference time immediately after the regeneration operation is finished (S110), determining, by the controller 9, whether or not an accumulated value of the $NO_x$ emission amounts measured by the rear end $NO_x$ sensor 7 is greater than an accumulated value of the $NO_x$ emission amounts calculated by the $NO_x$ emission amount model (S120); and correcting, by the controller 9, the ammonia occludable amount of the SCR apparatus 1 when the accumulated value of the $NO_x$ emission amounts measured by the rear end $NO_x$ sensor 7 is greater than the accumulated value of the $NO_x$ emission amounts calculated by the $NO_x$ emission amount model (S130).

That is, when the regeneration operation is repeated, if a process of learning the corrected model purification efficiency in the previous regeneration operation is performed, the ammonia occludable amount of the SCR apparatus 1 used to calculate the urea injection amount is corrected depending on the situation in the next regeneration operation.

The reason for this is to prevent ammonia slip in which, if a reduction in the ammonia occludable amount due to aged deterioration of the SCR apparatus 1 is not properly considered, the amount of unreacted ammonia is emitted downstream from the SCR apparatus 1 due to an excessive urea injection amount.

Figure 6:
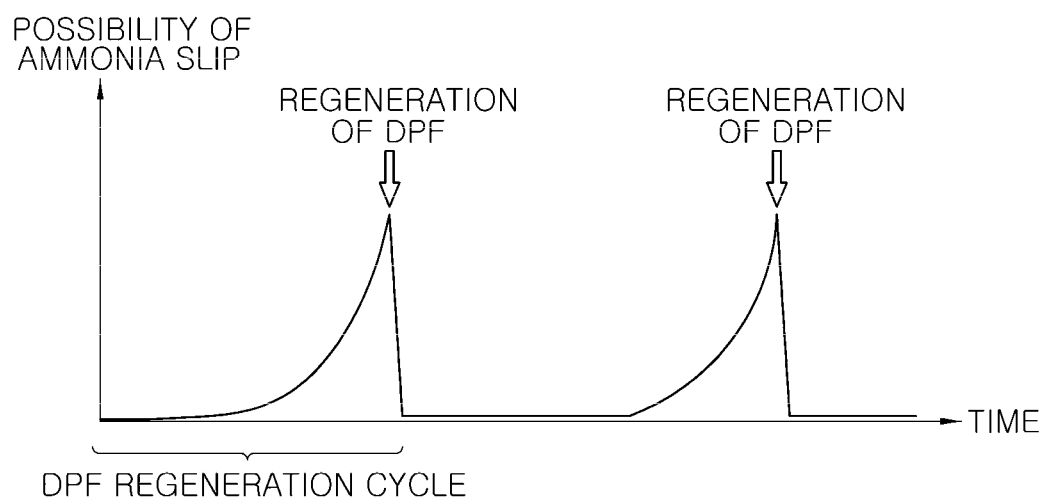
FIG. 6 is a graph showing ammonia emission probability as time passes.

Referring to FIG. 6, when regeneration of the DPF is repeated as time passes, the possibility of ammonia slip from the SCR apparatus 1 gradually increases as time passes, increases sharply when the possibility of ammonia slip exceeds a designated level, and is then eliminated due to regeneration of the DPF, and such a process is repeated.

The ammonia occlusion amount of the SCR apparatus 1 may be expressed using the following equation:

ammonia occlusion amount=urea injection amount− urea amount used to reduce $NO_x$−urea amount oxidized− unreacted urea amount.

Here, accurate modeling of the amount of urea oxidized and the amount of urea which does not participate in reaction, i.e., the amount of urea which is occluded into the wall of the SCR apparatus 1 but has a remarkably low reaction rate, or is occluded into the wall of the SCR apparatus 1 and does not thus actually participate in the reaction, is impossible, and as a result, precise detection of the ammonia occludable amount of the SCR apparatus 1 is impossible.

However, because all ammonia occluded in the SCR apparatus 1 is removed and thus no ammonia is occluded in the SCR apparatus 1 immediately after the regeneration operation, such as regeneration of the DPF, is performed, in the present disclosure, the ammonia occludable amount is to be suitably corrected using the second reference time for which the above situation is maintained.

Figure 7:
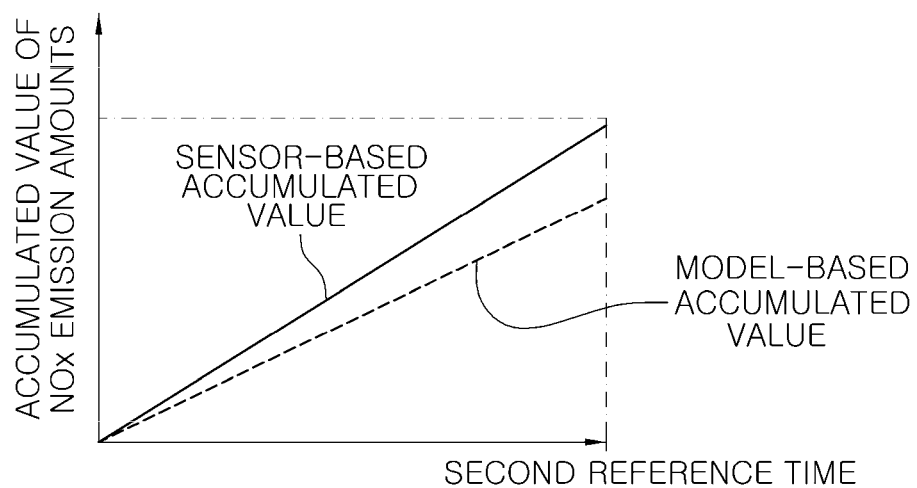
FIG. 7 is a graph showing accumulated values of $NO_x$ emission amounts for a second reference time.

That is, because the model purification efficiency was corrected in the previous regeneration operation and the $NO_x$ emission amount model was corrected thereby, the accumulated value of the $NO_x$ emission amounts measured by the rear end $NO_x$ sensor 7 (i.e., the sensor-based accumulated value) for the second reference time should be almost equal to the accumulated value of the $NO_x$ emission amounts calculated by the $NO_x$ emission amount model (i.e., the model-based accumulated value). However, when the sensor-based accumulated value is greater than the model-based accumulated value, as shown in FIG. 7, it is regarded that the amount of ammonia slipped downstream from the SCR apparatus 1 is erroneously sensed as an $NO_x$ emission amount by the rear end $NO_x$ sensor 7 and such erroneous sensing is caused by an error in the ammonia occludable amount used to calculate the urea injection amount.

Figure 8:
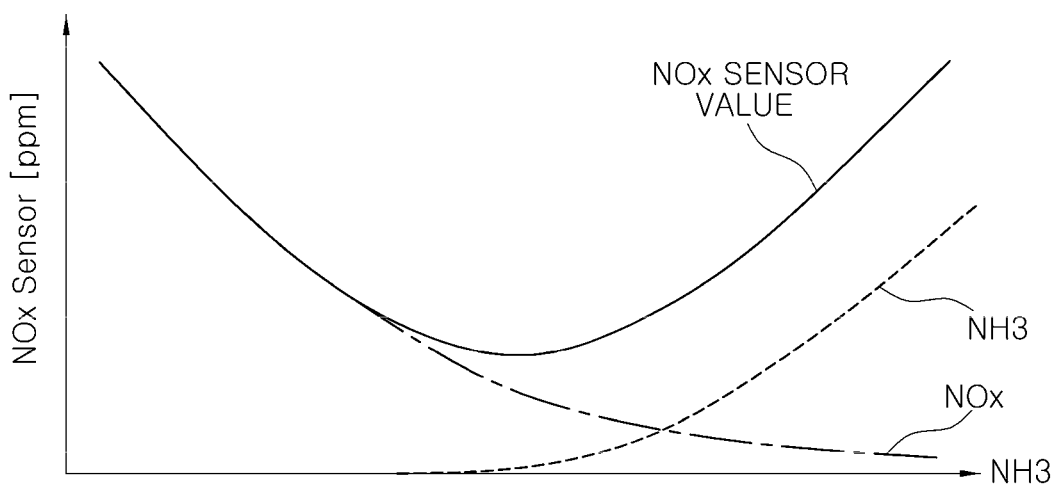
FIG. 8 is a graph showing a change in a value output by an $NO_x$ sensor depending on a change in an ammonia amount and a change in an $NO_x$ amount.

For reference, FIG. 8 is a graph exemplarily showing a change in a value output by the rear end $NO_x$ sensor 7 depending on a change in an ammonia amount and a change in an $NO_x$ amount, and the $NO_x$ sensor 7, which has the property of measuring both $NO_x$ and ammonia, erroneously senses ammonia slipped downstream from the SCR apparatus 1 as the NO emission amount.

Therefore, when the sensor-based accumulated value for the second reference time is greater than the model-based accumulated value, as described above, the controller 9 corrects the ammonia occludable amount so as to ultimately reduce the urea injection amount to an optimum level, thereby being capable of preventing emission of ammonia based on the unnecessary urea injection amount.

The controller 9 corrects the ammonia occludable amount of the SCR apparatus 1 by multiplying the ammonia occludable amount by a designated occlusion coefficient, and the occlusion coefficient has a value in the range of 0 to 1.

That is, the ammonia occludable amount will be gradually decreased due to aged deterioration of the SCR apparatus 1, and thus, the corrected ammonia occludable amount may be easily calculated by multiplying the previous ammonia occludable amount by the occlusion coefficient which is within the range of 0 to 1.

In more detail, the controller 9 calculates the urea injection amount using the following equation:

urea injection amount=$NO_x$ inflow rate×(corrected $NH_3$—$NO_x$ reaction ratio)×(corrected model purification efficiency)+(ammonia occludable amount×occlusion coefficient).

While the controller 9 controls the urea injection apparatus 5 to inject the calculated urea injection amount into the front end of the SCR apparatus 1, the controller finds the value of the occlusion coefficient by gradually decreasing the occlusion coefficient until the $NO_x$ emission amount calculated by the rear end $NO_x$ sensor 7 becomes equal to the $NO_x$ emission amount calculated by the NOx emission amount model.

That is, the controller 9 corrects the ammonia occludable amount of the SCR apparatus 1 using the value of the occlusion coefficient when the $NO_x$ emission amount calculated by the rear end $NO_x$ sensor 7 becomes equal to the $NO_x$ emission amount calculated by the $NO_x$ emission amount model, and calculates the urea injection amount using the corrected ammonia occludable amount using the following equation:

urea injection amount=$NO_x$ inflow rate×(corrected $NH_3$—$NO_x$ reaction ratio)×(corrected model purification efficiency)+(corrected ammonia occludable amount).

The controller 9 controls the urea injection apparatus 5 to inject the calculated urea injection amount, and thus allows the SCR apparatus 1 to exhibit the optimal purification function without emitting ammonia.

Here, the second reference time may be set to be equal to the first reference time or to be slightly different from the first reference time.

That is, the second reference time may be set based on a time for which all ammonia is removed from the SCR apparatus 1 because the temperature of the SCR apparatus 1 is still high immediately after the regeneration operation and new ammonia has not started to be occluded in the SCR apparatus 1, and the second reference time may be set to a different time from the first reference time as needed.

For reference, in the embodiment shown in FIG. 2, the second reference time is set to be equal to the first reference time, and the controller 9 sequentially turns on a slip diagnosis flag after correcting the model purification efficiency, accumulates $NO_x$ emission amounts measured by the rear end $NO_x$ sensor 7 of the SCR apparatus 1 and $NO_x$ emission amounts calculated by the $NO_x$ emission amount model respectively for the first reference time immediately after the regeneration operation is finished (S110), and determines whether or not the accumulated value of the $NO_x$ emission amounts measured by the rear end $NO_x$ sensor 7 is greater than the accumulated value of the $NO_x$ emission amounts calculated by the NOx emission amount model (S120), and corrects the ammonia occludable amount of the SCR apparatus 1 (S130), when the slip diagnosis flag is turned on.

The controller 9 may turn off the slip diagnosis flag after correcting the ammonia occludable amount of the SCR apparatus 1, and thus, again correct the model purification efficiency depending on the situation immediately after the next regeneration operation is performed.

As is apparent from the above description, the present disclosure provides a method for controlling an exhaust aftertreatment system for vehicles in which ammonia slip of an SCR apparatus may be prevented without providing an ammonia sensor downstream from the SCR apparatus so as to avoid an increase in vehicle costs, a suitable amount of urea may be injected in consideration of a change in purification efficiency due to aged deterioration of the SCR apparatus, and ultimately the SCR apparatus may purify $NO_x$ in exhaust gas into the optimum state so as to satisfy various regulations.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method for controlling an exhaust aftertreatment system for vehicles, the method comprising:
    determining, by a controller, whether or not a regeneration operation is finished;
    accumulating, by the controller, a first amount of $NO_x$ emission measured by a rear end $NO_x$ sensor of a selective catalytic reduction (SCR) apparatus and a second amount of $NO_x$ emission calculated by an $NO_x$ emission amount model respectively for a first reference period of time immediately after the regeneration operation is finished;
    determining, by the controller, whether or not a difference between an accumulated value of the first amount of $NO_x$ emission and an accumulated value of the second amount of $NO_x$ emission exceeds a reference value when the first reference period of time has elapsed;
    correcting, by the controller, a model purification efficiency used in the $NO_x$ emission amount model using a sensor purification efficiency acquired by a front end $NO_x$ sensor and the rear end $NO_x$ sensor of the SCR apparatus when the difference between the accumulated values exceeds the reference value; and
    controlling, by the controller, a urea injection apparatus to inject urea to the SCR apparatus via using the corrected model purification efficiency,
    wherein the regeneration operation is an operation of raising a temperature of the SCR apparatus so as to remove ammonia occluded in the SCR apparatus.

2. The method according to claim 1, wherein the correcting a model purification efficiency comprises:
    calculating an efficiency correction coefficient configured to make the model purification efficiency equal to the sensor purification efficiency; and
    multiplying the model purification efficiency by the efficiency correction coefficient.

3. The method according to claim 2, wherein multiplying the model purification efficiency by the efficiency correction coefficient includes calculating a urea injection amount using a corrected $NH_3$—$NO_x$ reaction ratio acquired by multiplying a $NH_3$—$NO_x$ reaction ratio by a reaction ratio correction coefficient, which is a reciprocal of the efficiency correction coefficient.

4. The method according to claim 3, further comprising, when a next regeneration operation is performed after the correcting the model purification efficiency:
    accumulating, by the controller, a third amount of $NO_x$ emission measured by the rear end $NO_x$ sensor and a fourth amount of $NO_x$ emission calculated by the $NO_x$ emission amount model respectively for a second reference period of time immediately after the regeneration operation is finished;
    determining, by the controller, whether or not an accumulated value of the third amount of $NO_x$ emission is greater than an accumulated value of the fourth amount of $NO_x$ emission; and
    correcting, by the controller, an ammonia occludable amount of the SCR apparatus when the accumulated value of the third amount of $NO_x$ emission is greater than the accumulated value of the fourth amount of $NO_x$ emission.

5. The method according to claim 4, wherein the correcting an ammonia occludable amount comprises multiplying the ammonia occludable amount by a occlusion coefficient, wherein the occlusion coefficient has a value in a range of 0 to 1.

6. The method according to claim 5, wherein in the calculating a urea injection amount, the controller calculates the urea injection amount using a following equation:

urea injection amount=$NO_x$ inflow rate×(corrected $NH_3$—$NO_x$ reaction ratio)×

(corrected model purification efficiency)+(ammonia occludable amount×occlusion coefficient), and wherein, while the controller controls the calculated urea injection amount to be injected into a front end of the SCR apparatus, the controller gradually decreases the occlusion coefficient until a fifth $NO_x$ emission amount measured by the rear end $NO_x$ sensor becomes equal to a sixth $NO_x$ emission amount calculated by the $NO_x$ emission amount model.

7. The method according to claim 6, wherein the correcting an ammonia occludable amount includes:
    applying the occlusion coefficient when the fifth $NO_x$ emission amount calculated by the rear end $NO_x$ sensor becomes equal to the the sixth $NO_x$ emission amount calculated by the $NO_x$ emission amount model; and
    calculating the urea injection amount using a following equation and controls the calculated urea injection amount to be injected:

urea injection amount=$NO_x$ inflow rate×(corrected $NH_3$—$NO_x$ reaction ratio)×

(corrected model purification efficiency)+(corrected ammonia occludable amount).

8. The method according to claim 4, wherein, when the second reference period of time is set to be equal to the first reference period of time, the controller sequentially performs:
    turning on a slip diagnosis flag after correcting the model purification efficiency,
    accumulating the third amount of $NO_x$ emission and the fourth amount of $NO_x$ emission immediately after the regeneration operation is finished, and
    when the slip diagnosis flag is turned on, determining whether or not the accumulated value of the third amount of $NO_x$ emission is greater than the accumulated value of the fourth amount of $NO_x$ emission, and correcting the ammonia occludable amount of the SCR apparatus.

9. The method according to claim 8, further comprising turning off, by the controller, the slip diagnosis flag after the correcting the ammonia occludable amount of the SCR apparatus.

10. The method according to claim 1, wherein the $NO_x$ emission amount model is calculated using a following equation:

$NO_x$ emission amount model=$NO_x$ inflow rate−$NO_x$ purification amount model=

$NO_x$ inflow rate×(1-model purification efficiency), wherein $NO_x$ purification amount model=$NO_x$ inflow rate×model purification efficiency.

\* \* \* \* \*